United States Patent
Clemen

(10) Patent No.: US 9,683,743 B2
(45) Date of Patent: Jun. 20, 2017

(54) COMBUSTION CHAMBER TILE OF A GAS TURBINE

(71) Applicant: Rolls-Royce Deutschland Ltd & Co KG, Blankenfelde-Mahlow (DE)

(72) Inventor: Carsten Clemen, Mittenwalde (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 776 days.

(21) Appl. No.: 14/072,452

(22) Filed: Nov. 5, 2013

(65) Prior Publication Data
US 2014/0130501 A1  May 15, 2014

(30) Foreign Application Priority Data
Nov. 13, 2012 (DE) .......................... 10 2012 022 199

(51) Int. Cl.
| | |
|---|---|
| F23R 3/00 | (2006.01) |
| F23M 5/02 | (2006.01) |
| F23M 5/04 | (2006.01) |
| F23R 3/60 | (2006.01) |
| F02C 7/20 | (2006.01) |

(52) U.S. Cl.
CPC ............. *F23R 3/00* (2013.01); *F23M 5/02* (2013.01); *F23M 5/04* (2013.01); *F23R 3/002* (2013.01); *F23R 3/60* (2013.01); *F02C 7/20* (2013.01); *F23R 2900/00017* (2013.01); *F23R 2900/03041* (2013.01); *F23R 2900/03042* (2013.01)

(58) Field of Classification Search
CPC .. F23R 3/002; F23R 3/60; F23R 2900/03041; F23R 2900/03042; F23R 2900/00017; F23R 3/00; F02C 7/20; F23M 5/02; F23M 5/04
See application file for complete search history.

(56) References Cited

U.S. PATENT DOCUMENTS

| | | | |
|---|---|---|---|
| 6,085,515 A | 7/2000 | Walz et al. | |
| 6,223,538 B1 | 5/2001 | Benz et al. | |
| 6,341,485 B1 * | 1/2002 | Liebe | F23R 3/002 60/760 |
| 6,895,761 B2 | 5/2005 | Mitchell et al. | |

(Continued)

FOREIGN PATENT DOCUMENTS

| | | |
|---|---|---|
| DE | 19623300 | 12/1997 |
| DE | 10214570 | 1/2004 |

(Continued)

OTHER PUBLICATIONS

English-language translation of description from EP 1467151 A1 (original foreign reference was previously submitted by Applicant).*

(Continued)

*Primary Examiner* — Gerald L Sung
*Assistant Examiner* — Scott Walthour
(74) *Attorney, Agent, or Firm* — Shuttleworth & Ingersoll, PLC; Timothy J. Klima

(57) ABSTRACT

A combustion chamber tile of a gas turbine includes a bolt for mounting the combustion chamber tile on a combustion chamber wall, with the combustion chamber tile being designed substantially plate-like and having on one side at least one mounting element, on which the bolt, which is provided as a separate component, is positively anchored.

20 Claims, 13 Drawing Sheets

(56) References Cited

U.S. PATENT DOCUMENTS

| | | |
|---|---|---|
| 7,059,133 B2 | 6/2006 | Gerendas |
| 8,069,670 B2 | 12/2011 | Schmahl et al. |
| 2003/0123953 A1 | 7/2003 | Razzell |
| 2010/0162717 A1 | 7/2010 | O'Leary |
| 2011/0030378 A1* | 2/2011 | Carlisle .................. F23R 3/002 60/753 |

FOREIGN PATENT DOCUMENTS

| EP | 972992 | 1/2000 |
|---|---|---|
| EP | 1467151 | 10/2004 |
| EP | 1712840 | 10/2006 |
| EP | 1741981 | 1/2007 |
| EP | 2261564 | 12/2010 |
| EP | 2423596 | 2/2012 |

OTHER PUBLICATIONS

English-language translation of description from EP 2423596 A1 (original foreign reference was previously submitted by Applicant).*

English-language translation of description from EP 2261564 A1 (original foreign reference was previously submitted by Applicant).*

German Search Report dated Jun. 20, 2013 from counterpart app No. 10 2012 022 199.1.

European Search Report dated Jan. 3, 2014 for counterpart European patent application No. 13191945.8.

* cited by examiner

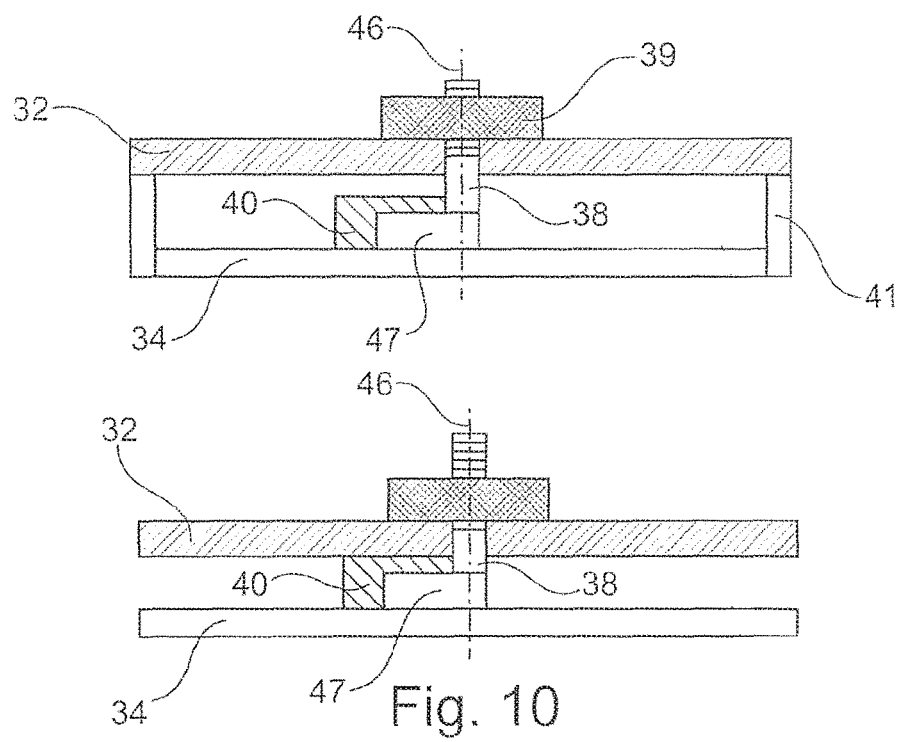
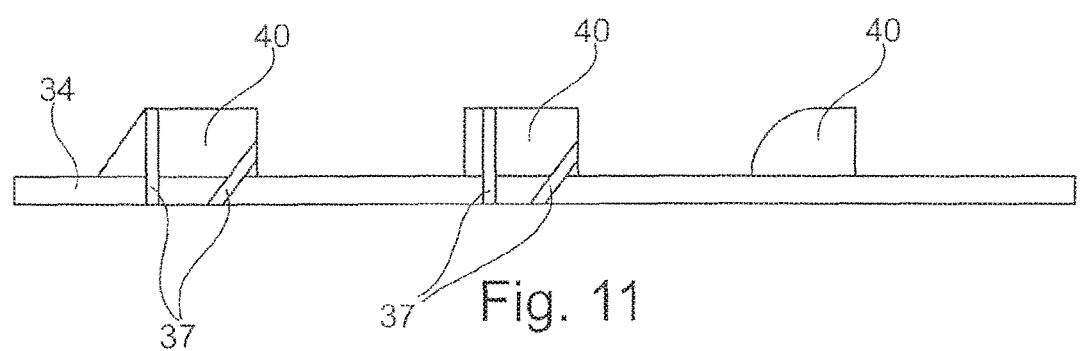
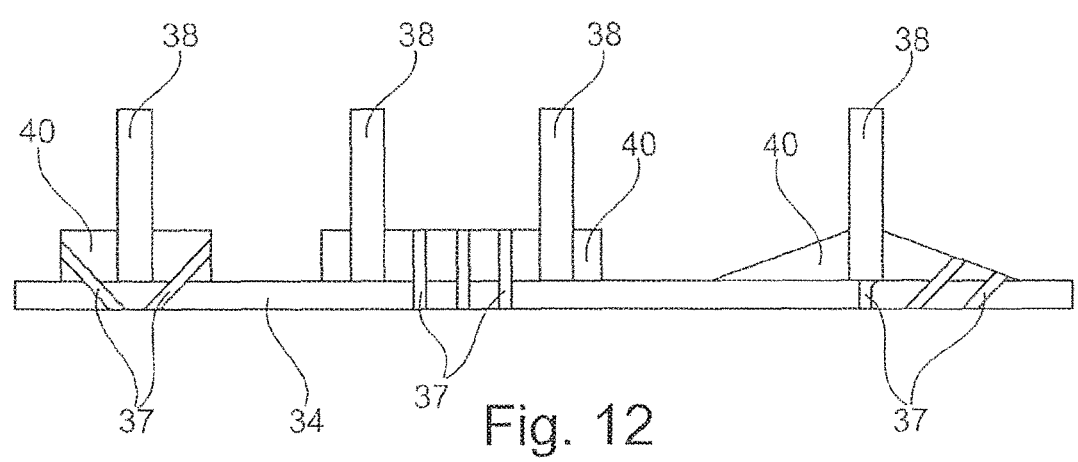

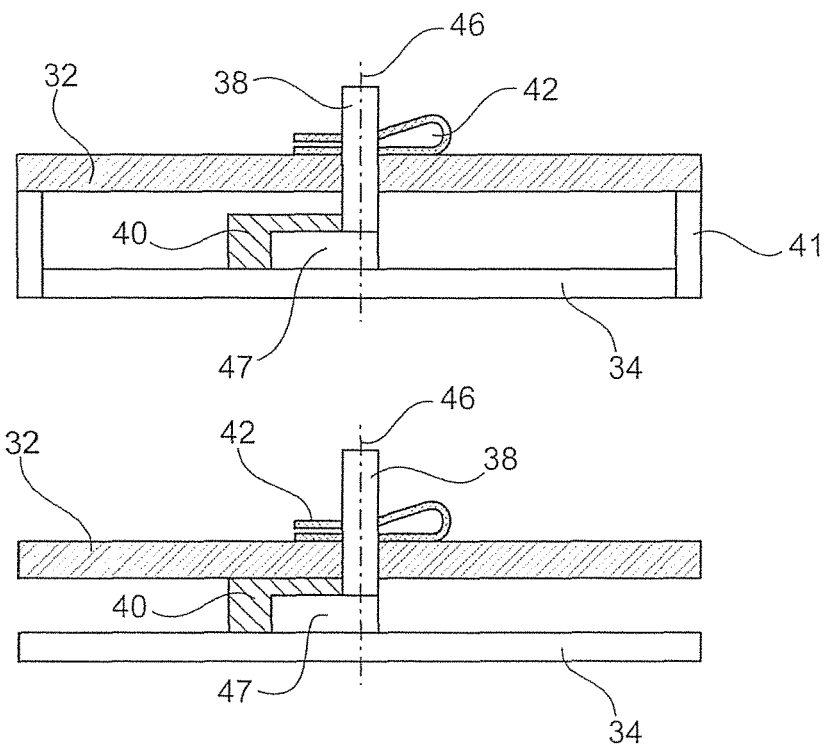
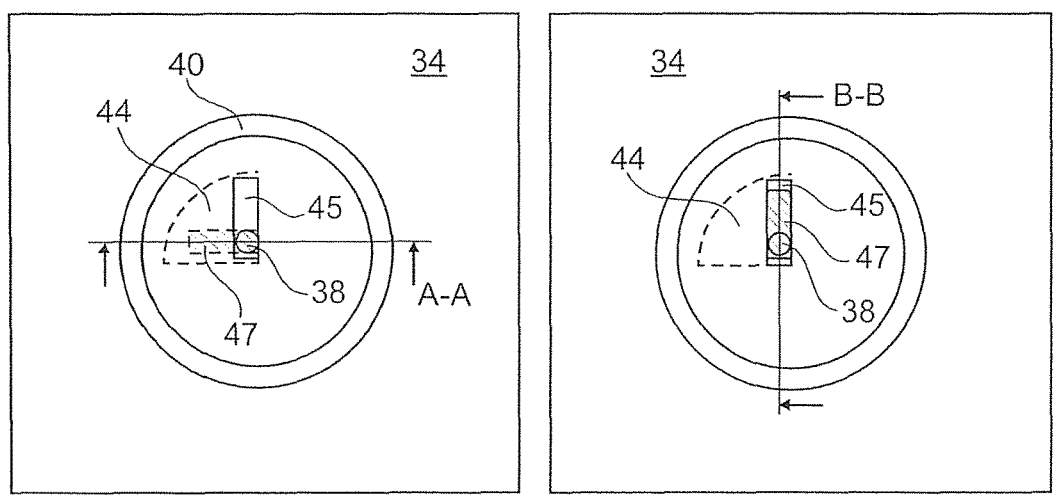
Fig. 13
Fig. 14

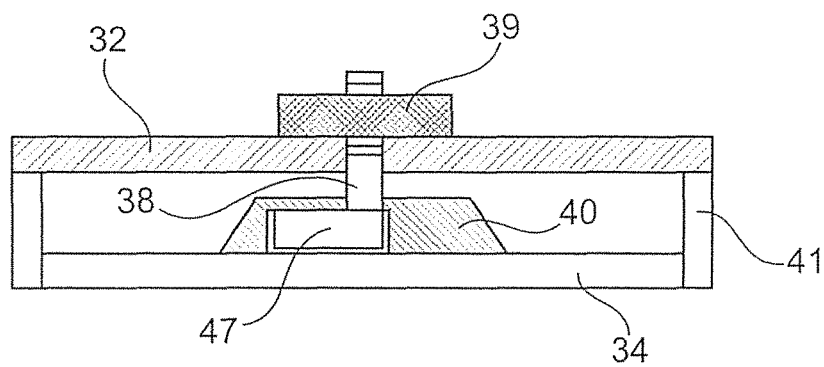
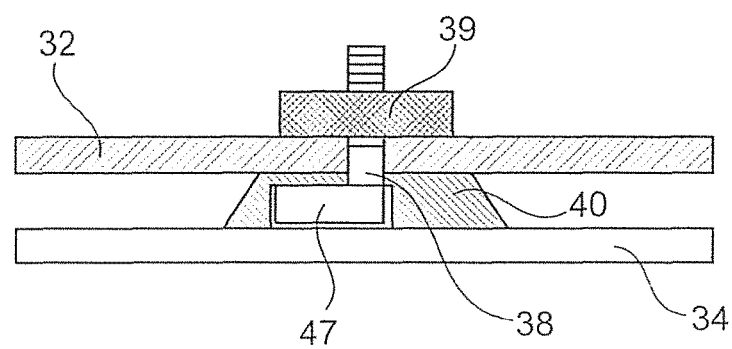
Fig. 17
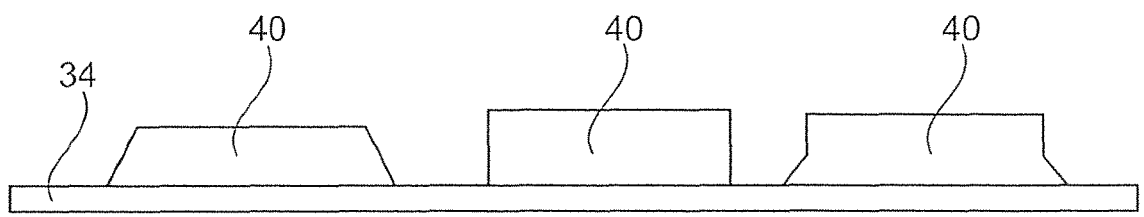
Fig. 18

COMBUSTION CHAMBER TILE OF A GAS TURBINE

This application claims priority to German Patent Application DE102012022199.1 filed Nov. 13, 2012, the entirety of which is incorporated by reference herein.

This invention relates to gas-turbine combustion chambers with combustion chamber tiles, where the combustion chamber tiles are fastened to a supporting structure of the combustion chamber outer walls.

The combustion chamber tiles have an arbitrary number (very high, often in the thousands) of effusion cooling holes on the side facing the combustion chamber. These effusion cooling holes are used to cool the tile against the high temperatures in the combustion chamber. Moreover, at least one mixing air hole is located on the combustion chamber tile and is used to pass air from the space (annulus) surrounding the combustion chamber on the outside into the combustion chamber, for the purpose of cooling the combustion and making it lean, thereby reducing the amount of NOx generated. In addition to cooling by the effusion cooling holes, the tiles are frequently also provided with a ceramic coating acting as an insulating layer against the high temperatures in the combustion chamber.

This arrangement is known from the state of the art, cf. EP 972 992 B1 or DE 102 14 570 A1.

FIG. 2 shows schematically a combustion chamber 15. The combustion chamber 15 includes a fuel nozzle 29 which is mounted in the usual way on a combustion chamber head. Furthermore, a combustion chamber outer casing 30 and a combustion chamber inner casing 31 are provided. A combustion chamber wall 32 encloses the combustion chamber 15 proper and supports combustion chamber tiles 34. The reference numeral 33 shows schematically a turbine inlet guide vane row. Air is supplied in the usual way through admixing holes 35. The inflow direction is indicated with the reference numeral 36.

FIG. 3 shows a tile 34 with effusion cooling holes 37 according to the state of the art. The geometry (diameter, shape) of the admixing hole 35 can, as is known from the state of the art, be designed in a suitable way. The same applies for the size and arrangement of the effusion cooling holes 37. The admixing holes 35 are frequently designed as a funnel or tube projecting into the combustion chamber 15.

The tiles 34 are usually manufactured either by casting, coating with a ceramic layer and drilling of the effusion cooling holes 37 (e.g. with laser), by casting, drilling and coating, or by an additive manufacturing method such as selective laser sintering, direct laser depositioning or electron-beam build-up welding. With the additive methods, the effusion cooling holes 37 are made directly in the tile 34, and expensive drilling is not required.

During operation, there are recurring problems with so-called 'creep' of the material, which can lead to failure of the set screw and hence to loss of the tile.

Furthermore, the design of the tile with integrated set screw is only of limited suitability for additive manufacturing, such as selective laser sintering, direct laser depositioning or electron-beam build-up welding, since either cost-intensive horizontal manufacture has to be selected or an expensive sub-structure has to be provided for supporting the set screw. A sub-structure of this type has considerable disadvantages: a) it is material-intensive, b) it prolongs the manufacturing process, and c) it has to be removed from the tile after manufacture, which is very cost-intensive.

The object underlying the present invention is to provide a combustion chamber tile of a gas turbine and a fastening possibility for a combustion chamber of this type which while being simply designed and easily and cost-effectively producible avoid the disadvantages of the state of the art and ensure good fastenability.

It is a particular object to provide a solution to the above problems by features described herein. Further advantageous embodiments will become apparent from the present description.

In accordance with the invention, it is thus provided that the tile is designed substantially plate-like and has on one side (i.e. on the side facing the combustion chamber wall) at least one mounting element which is designed in one piece with the tile. The mounting element is designed such that a bolt, which is produced as a separate component, can be positively anchored on it or fastened to it.

The combustion chamber tile in accordance with the invention is thus designed such that a separate bolt, which in accordance with the invention can be a threaded bolt or a bolt that can be fastened with a locking element, is positively anchored on the tile. It is thus possible in accordance with the invention to produce the bolt from a different material to that of the tile. Furthermore, it is possible to select a simple and inexpensive manufacturing method for the tile, since the bolt can be made as a separate component. In particular, due to the possibility of using different materials for the tile and the bolt, it is possible to solve the fastening problems known from the state of the art and to prevent or minimize creep of the bolt material.

In accordance with the invention, it is preferably provided that the bolt has at its end area a mounting section arranged at right angles to the bolt axis and in a recess of the mounting element. The bolt is thus designed hook-shaped, in particular L-shaped, and is inserted into the recess of the mounting element. The mounting section of the bolt can be dimensioned in a suitable way, for example plate-like or with any other cross-sections, for example round, oval, square or rectangular. The combustion chamber tile thus has, due to the mounting element and the recess provided in it, a receptacle for the bolt, so that the latter can be engaged positively into the tile. It is possible in accordance with the invention to accommodate the mounting section with or without clearance in the recess, in particular in order to take into account differing thermal expansions or the like.

The recess of the mounting element is designed such that the mounting section of the bolt can be inserted from the side. To prevent the mounting section of the bolt from slipping out of the recess of the mounting element during operation, it may be favourable in a further development of the invention to provide several such mounting elements on a tile, the recesses of which open towards different directions. This prevents loosening of the bolt.

The bolt in accordance with the invention is inserted in the usual way through a hole in the combustion chamber outer wall, so that the fastening proper of the bolt does not differ substantially from the state of the art. It is thus possible with a threaded bolt to screw on a nut in the usual way.

The embodiment in accordance with the invention also permits supporting of the tile to keep it clear of the combustion chamber wall, or in an alternative embodiment to have the tile directly contacting the combustion chamber wall. Differing cooling concepts can therefore be designed, as is also known from the state of the art.

It is furthermore possible in accordance with the invention to design the outer contour of the mounting element fastened to the combustion chamber tile in a flow-optimized manner, for example with chamfered flanks. Effusion cooling holes can also be provided in the mounting element in accordance with the invention to assure cooling of the combustion chamber tile.

The bolt in accordance with the invention with the mounting section provided on it can be cast, milled or made using an additive method.

The present invention is described in the following in light of the accompanying drawing, showing exemplary embodiments. In the drawing, FIG. 1 shows a schematic representation of a gas-turbine engine in accordance with the present invention, FIG. 2 shows a schematic (sectional) side view of a combustion chamber in accordance with the state of the art, FIG. 3 shows a top view and a side view of a combustion chamber tile known from the state of the art, FIG. 4 shows a sectional side view of a fastening possibility of a combustion chamber tile to the combustion chamber outer wall in accordance with the state of the art, FIG. 5 shows various side views of different exemplary embodiments of the bolt in accordance with the present invention provided with a mounting section, FIG. 6 shows a top view onto a combustion chamber tile of the present invention with mounting element and bolt, FIG. 7 shows side views of various assignments of the bolt to the mounting element, FIG. 8 shows a representation by analogy with FIG. 7, FIG. 9 shows simplified top views onto different embodiments of combustion chamber tiles with several mounting elements, FIG. 10 shows side views of an exemplary embodiment in accordance with the present invention by analogy with FIG. 4, FIGS. 11 and 12 show exemplary embodiments of different mounting elements with effusion cooling holes, FIG. 13 shows a representation of a further exemplary embodiment with locking pin by analogy with FIG. 10, FIG. 14 shows top views of different assembly states of a further exemplary embodiment of the present invention, by analogy with the representation of FIG. 6, FIG. 15 shows varying arrangements in accordance with the exemplary embodiment of FIG. 14, FIG. 16 shows different assembly states of the exemplary embodiment shown in FIGS. 14 and 15 by analogy with FIG. 8, FIG. 17 shows a representation by analogy with FIG. 10, FIG. 18 shows a simplified side view of different embodiments of the mounting element in accordance with the exemplary embodiment of FIGS. 14 to 17, FIG. 19 shows simplified sectional side views of different design variants, by analogy with the representation of FIG. 12, FIG. 20 shows representations by analogy with FIG. 13, FIG. 21 shows views of a further exemplary embodiment of the bolt in accordance with the present invention, by analogy with FIG. 5, FIG. 22 shows various assignments between bolt and combustion chamber tile, by analogy with the representation of FIG. 15, FIG. 23 shows different assembly states by analogy with FIG. 16, and FIG. 24 shows simplified top views onto the exemplary embodiment by analogy with the FIG. 14.

The gas-turbine engine 10 in accordance with FIG. 1 is an example of a turbomachine where the invention can be used. The following however makes clear that the invention can also be used in other turbomachines. The engine 10 is of conventional design and includes in the flow direction, one behind the other, an air inlet 11, a fan 12 rotating inside a casing, an intermediate-pressure compressor 13, a high-pressure compressor 14, combustion chambers 15, a high-pressure turbine 16, an intermediate-pressure turbine 17 and a low-pressure turbine 18 as well as an exhaust nozzle 19, all of which being arranged about a center engine axis 1.

The intermediate-pressure compressor 13 and the high-pressure compressor 14 each include several stages, of which each has an arrangement extending in the circumferential direction of fixed and stationary guide vanes 20, generally referred to as stator vanes and projecting radially inwards from the engine casing 21 in an annular flow duct through the compressors 13, 14. The compressors furthermore have an arrangement of compressor rotor blades 22 which project radially outwards from a rotatable drum or disk 26 linked to hubs 27 of the high-pressure turbine 16 or the intermediate-pressure turbine 17, respectively.

The turbine sections 16, 17, 18 have similar stages, including an arrangement of fixed stator vanes 23 projecting radially inwards from the casing 21 into the annular flow duct through the turbines 16, 17, 18, and a subsequent arrangement of turbine blades 24 projecting outwards from a rotatable hub 27. The compressor drum or compressor disk 26 and the blades 22 arranged thereon, as well as the turbine rotor hub 27 and the turbine rotor blades 24 arranged thereon rotate about the engine axis 1 during operation.

FIG. 4 shows various side views according to the state of the art, illustrating a support 41 of the combustion chamber tile 34 relative to the combustion chamber wall 32.

FIG. 5 shows a first group of exemplary embodiments of the bolt 38 in accordance with the invention, the bolt being designed as a threaded bolt (thread 43) and provided at its lower end area with a mounting section 47 each. The mounting section 47 extends at right angles to the bolt axis 46, so that a hook-like structure results. The left-hand representation of FIG. 5 shows a side view, while the two right-hand representations each show top views onto various embodiments of the mounting sections 47. The latter are designed bar-like or plate-like and have, as is shown in the middle four representations of FIG. 5, optionally varying cross-sections, i.e. round, square, elliptic or rectangular.

FIG. 6 shows a top view onto an exemplary embodiment of the combustion chamber tile 34, on which a mounting element 40 is fastened in one piece as shown in the following in FIGS. 7 and 8. This element has a recess 44 into which the mounting section 47 of the bolt 38 can be inserted. The bolt 38 is thus hooked into the mounting element 40 and can then be screwed in place by means of the nut 39 as shown by FIG. 7 in various side views. The top half of FIG. 8 shows the recess 44 in the empty state, while the bottom half of the figure shows the mounting section 47 of the bolt 38 inserted.

FIG. 9 shows simplified top views onto various exemplary embodiments of combustion chamber tiles 34. It is clearly discernible that these tiles are each provided with several mounting elements 40. The openings of the recesses 44 are each aligned differently, so that it is not possible during operation of the gas turbine for the bolts with their mounting sections 47 to come loose from the mounting elements 40.

FIG. 10 shows a representation by analogy with FIG. 4, showing that the combustion chamber tile 34 can either be kept apart by supports 41 or that the respective mounting element 40 is in direct contact with the combustion chamber wall 32.

FIGS. 11 and 12 show different cross-sections, by analogy with different embodiments of the mounting elements 40, with effusion cooling holes 37.

FIG. 13 shows an exemplary embodiment of the bolt 38 by analogy with FIG. 10, where the bolt 38 is held on the combustion chamber wall 32 by means of a locking pin 42.

FIG. 14 and the subsequent exemplary embodiments show a further design variant in accordance with the invention, by analogy with the representations in FIGS. 6 to 8. Identical parts are provided with the same reference numerals. Unlike the first group of exemplary embodiments, the concept underlying FIG. 14 and the following has in each case a recess 44 which is only opened via a slot 45. The mounting section 47 of the bolt 38 is inserted through the slot 45. By a subsequent turn of the bolt 38, for example by 90°, the mounting section 47 is then firmly anchored in the recess 44. FIG. 14 shows in the right-hand representation the insertion of the bolt 38 with the mounting section 47, while the left-hand half of FIG. 14 shows the rotated and hence locked state. This situation is also shown in the representations in FIG. 15. FIG. 16 shows the empty recess 44, while the bottom half of that figure shows the inserted mounting section 47 of the bolt 38.

FIG. 17 shows a representation by analogy with FIG. 10, from which can be seen the fastening of the combustion chamber tile on the combustion chamber wall in the exemplary embodiment described here, i.e. on the one hand by direct contact of the mounting section 40 and on the other hand by an interposed support 41.

FIG. 18 shows, together with FIG. 19, different design variants of the mounting element 40 in the design concept described here, with FIG. 19 showing the arrangements of effusion cooling holes 37.

Figure 1:
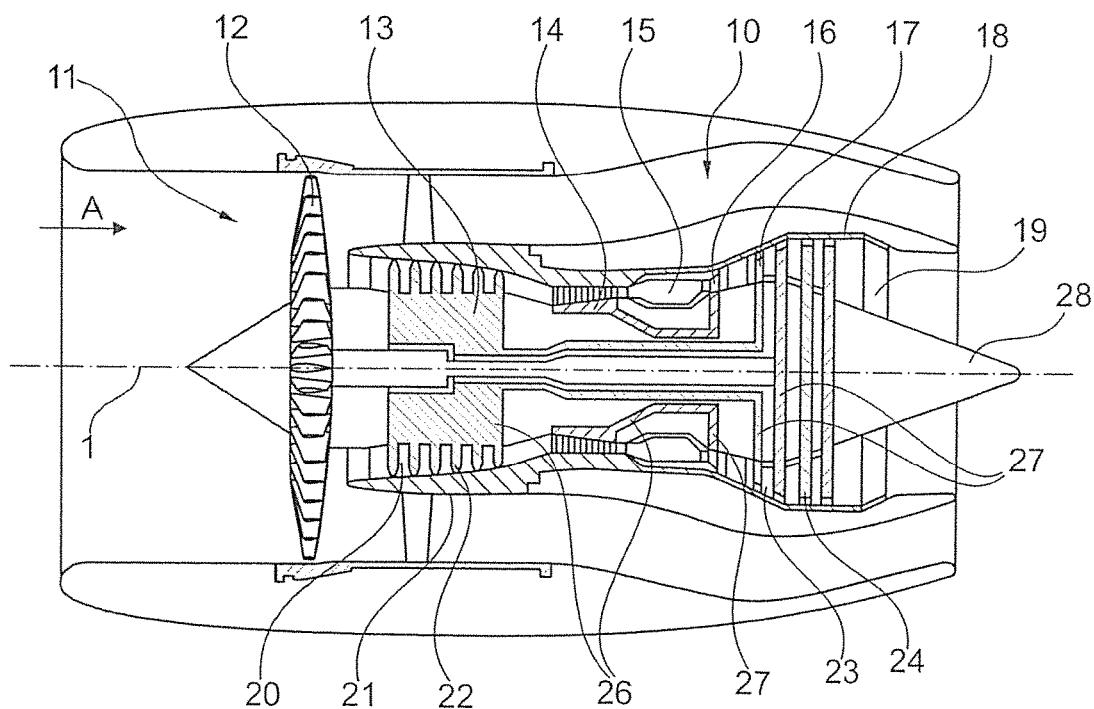
Figure 2:
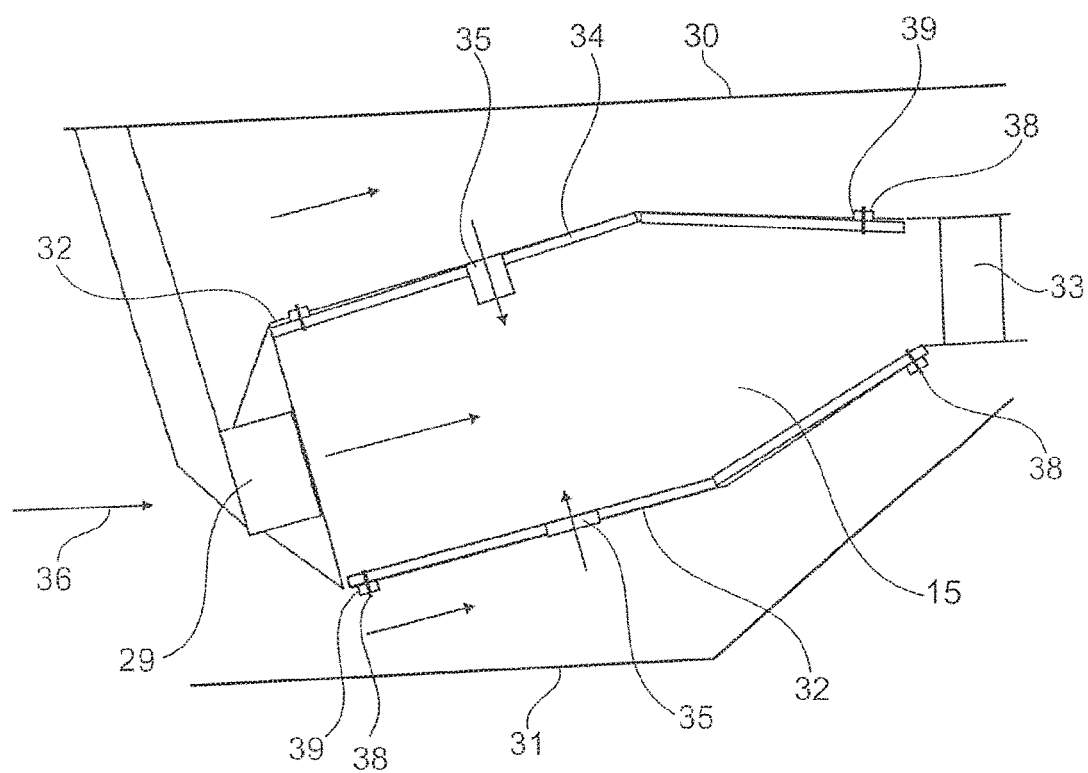
Figure 3:
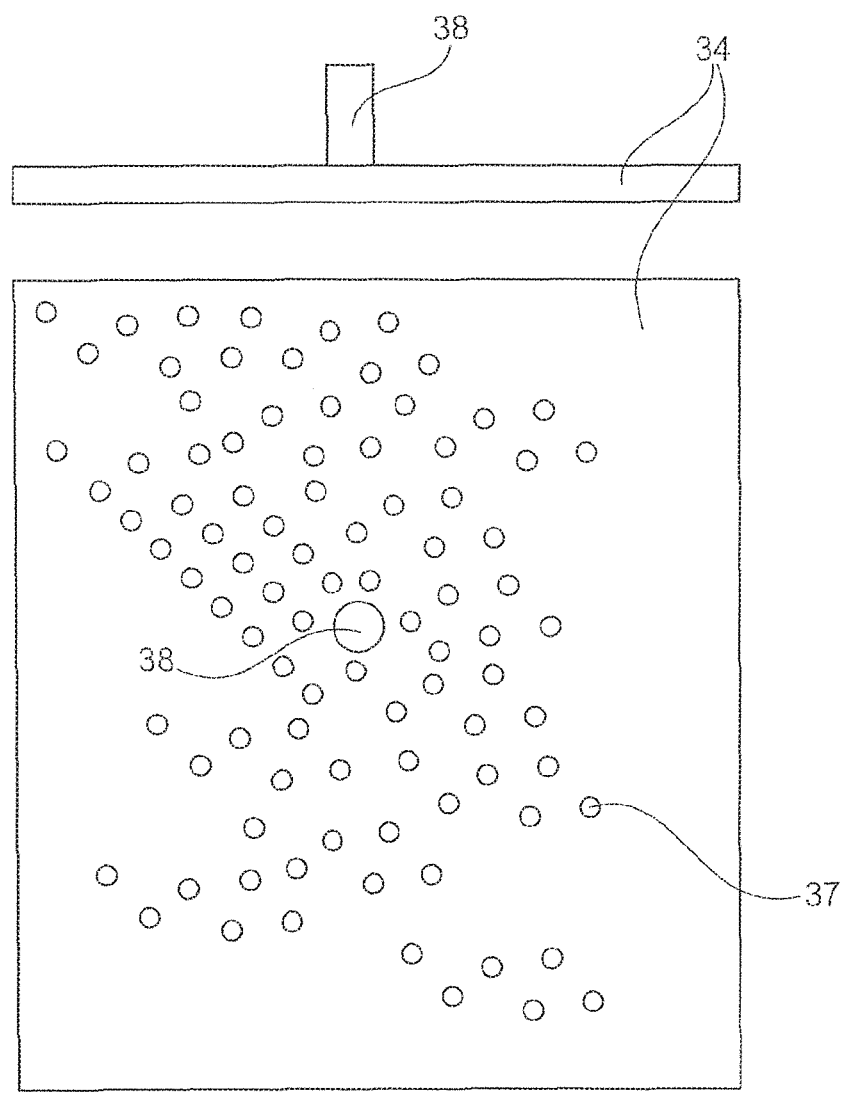
Figure 4:
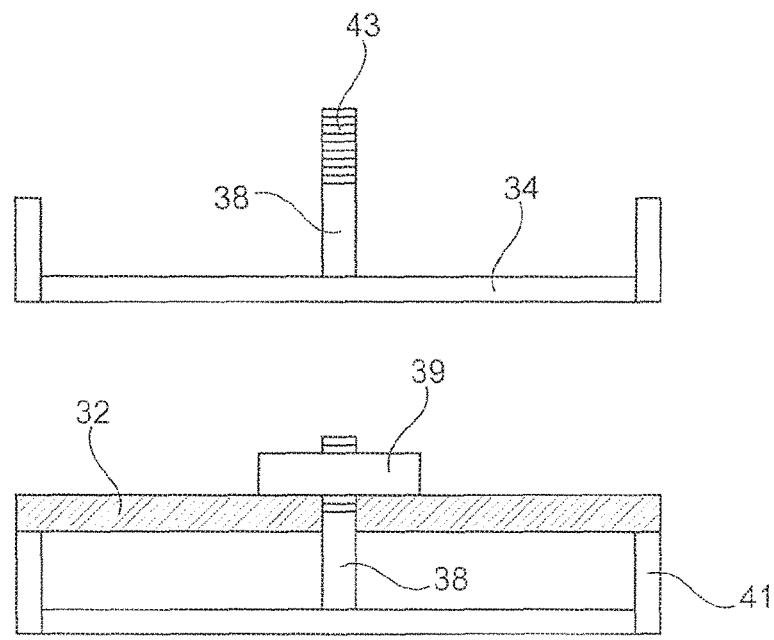
Figure 5:
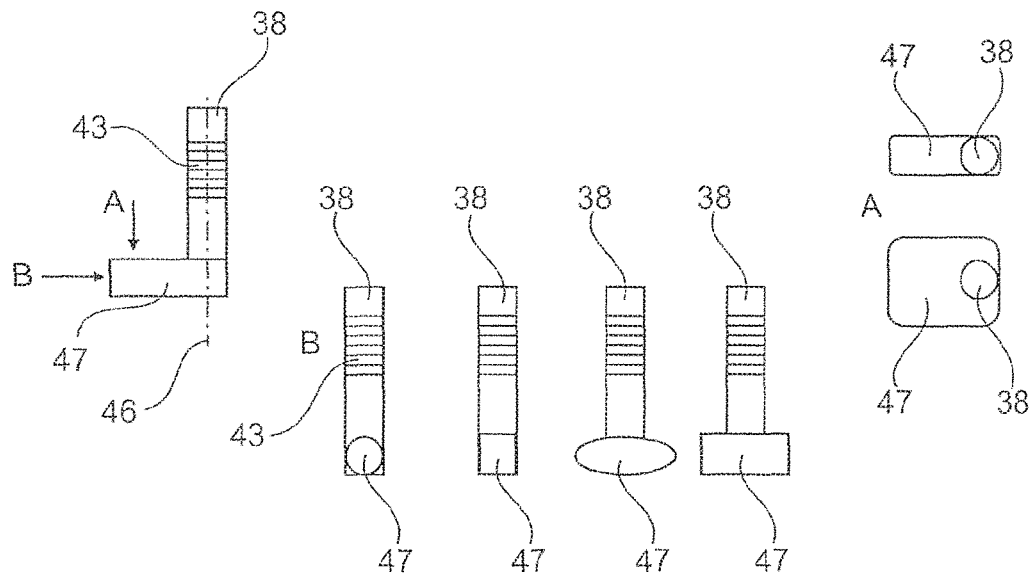
Figure 6:
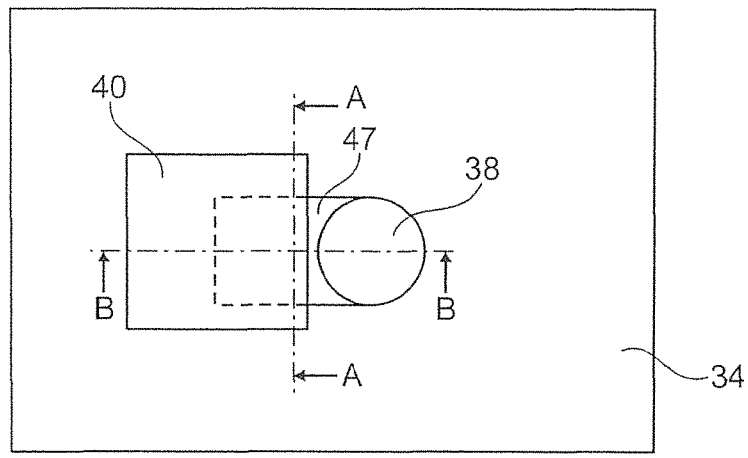
Figure 7:
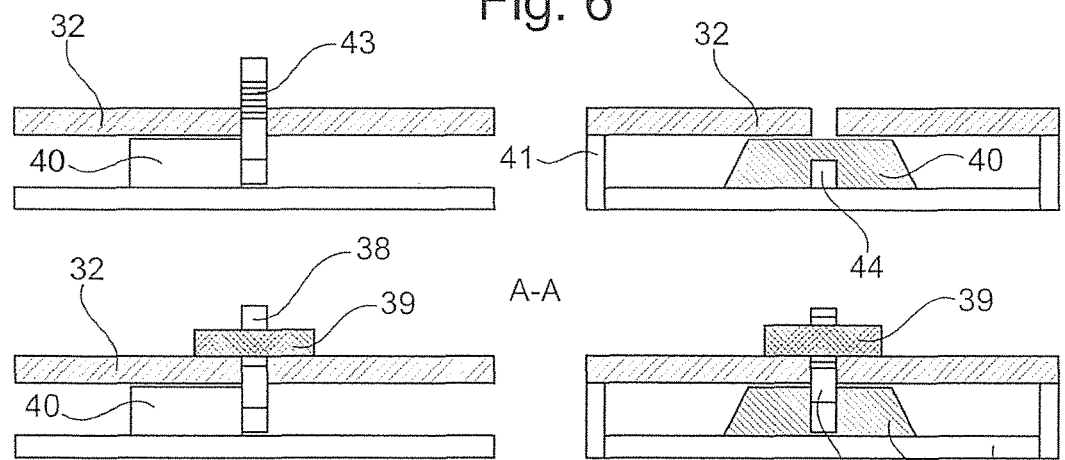
Figure 8:
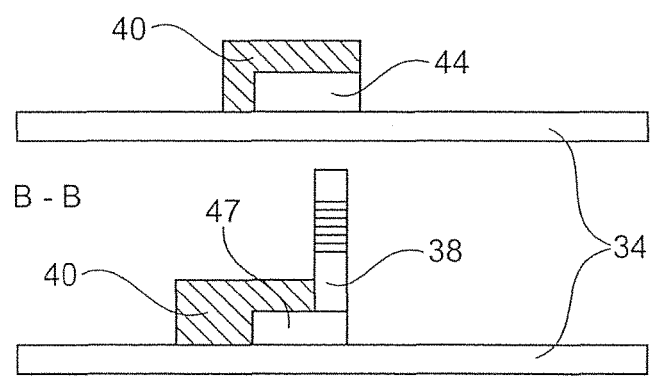
Figure 9:
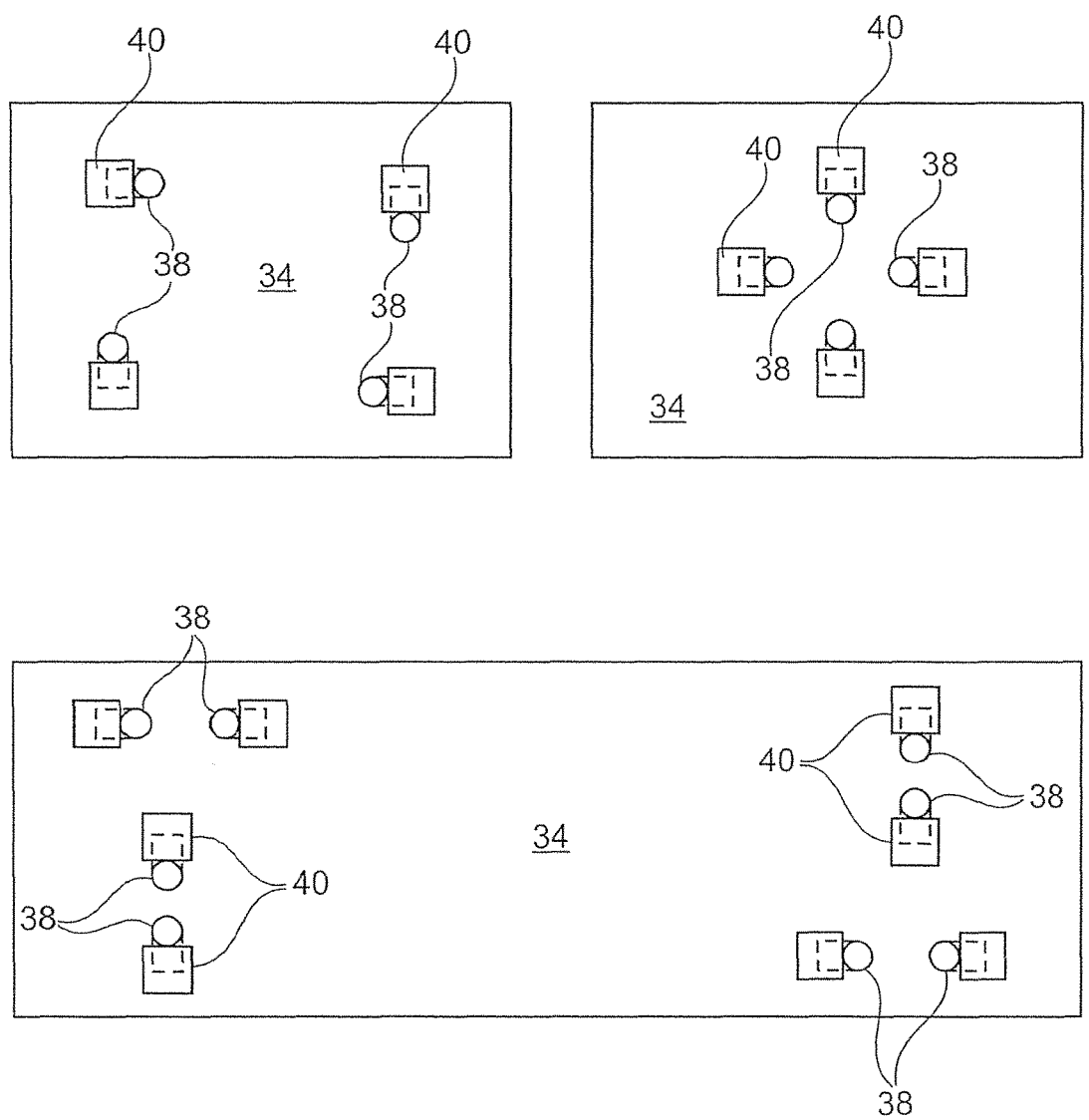
Figure 15:
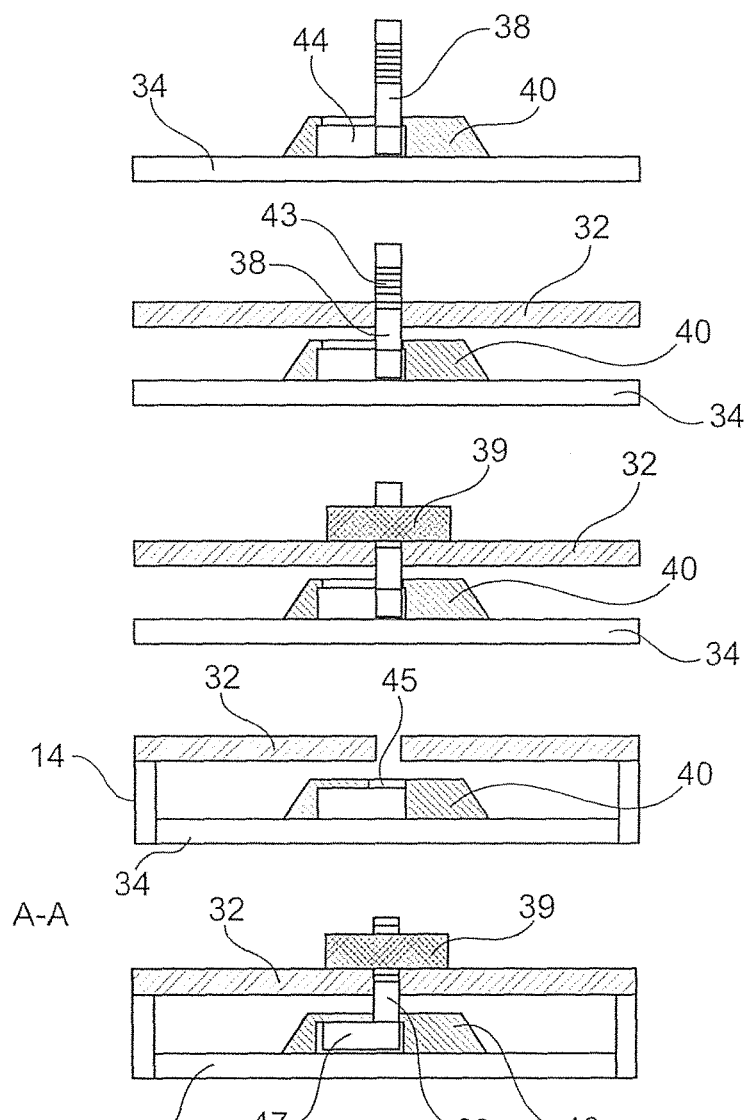
Figure 16:
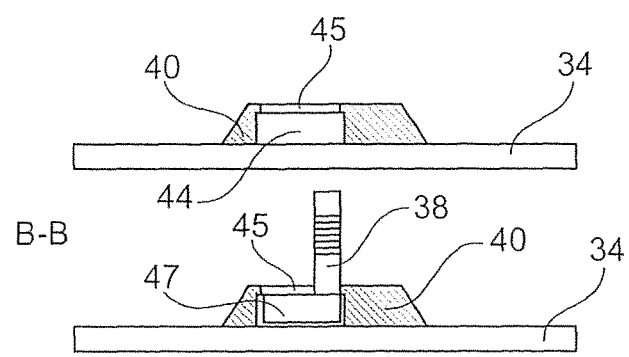
Figure 19:
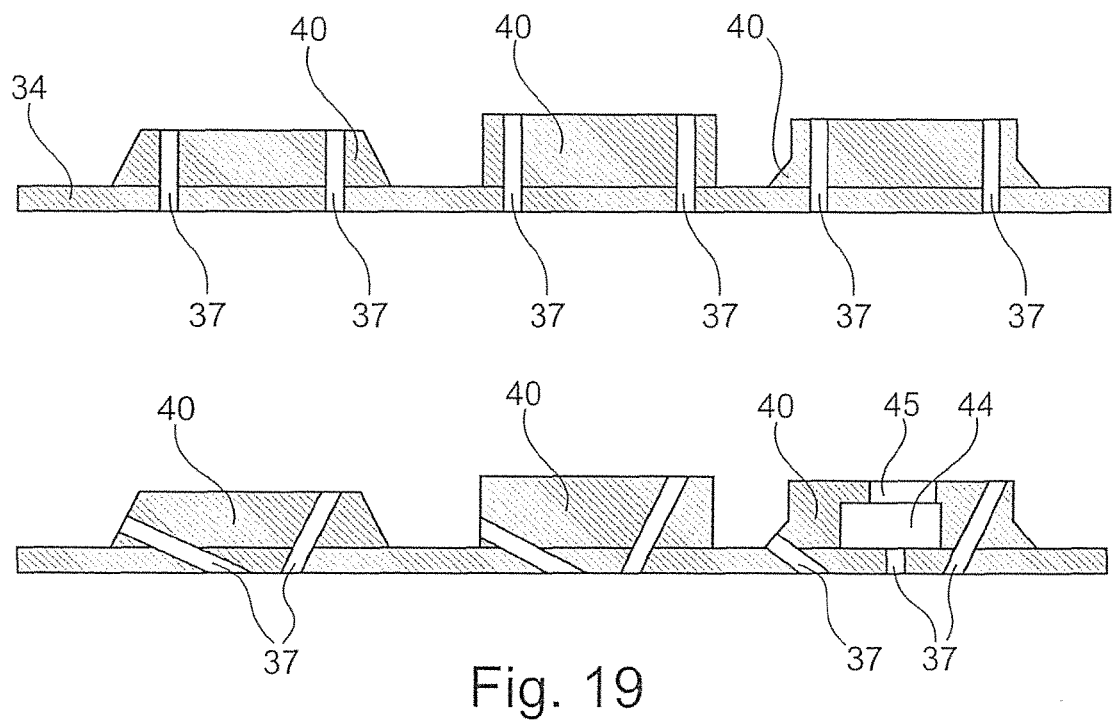
Figure 20:
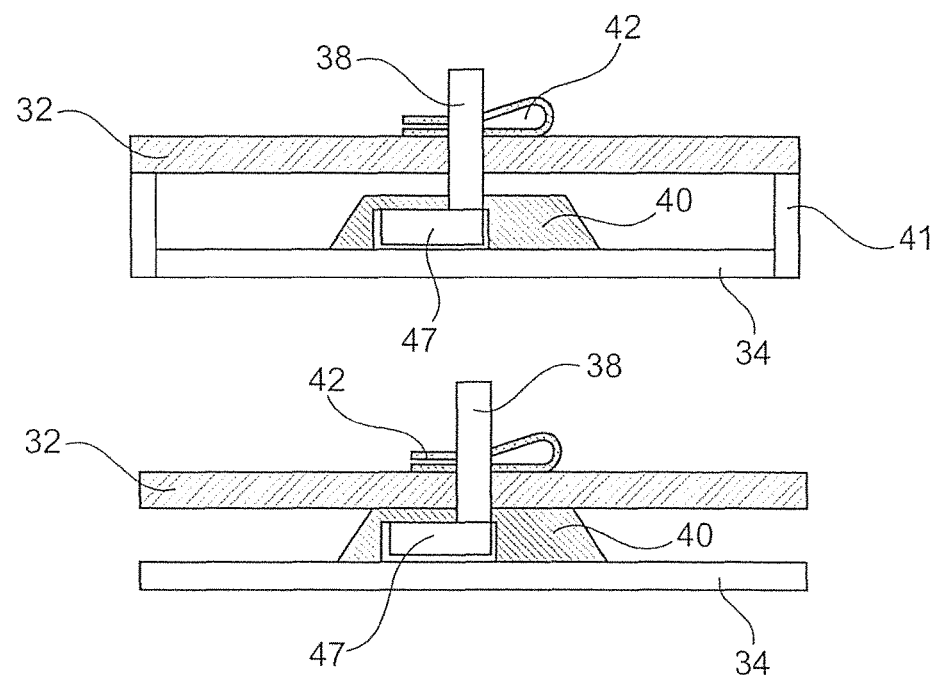
FIG. 20 shows a representation, by analogy with FIG. 13, with the use of a locking pin 42.
Figure 21:
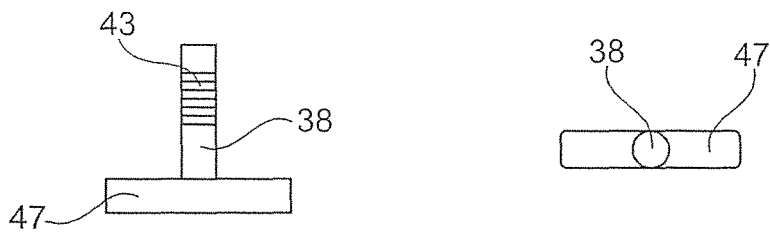
Figure 22:
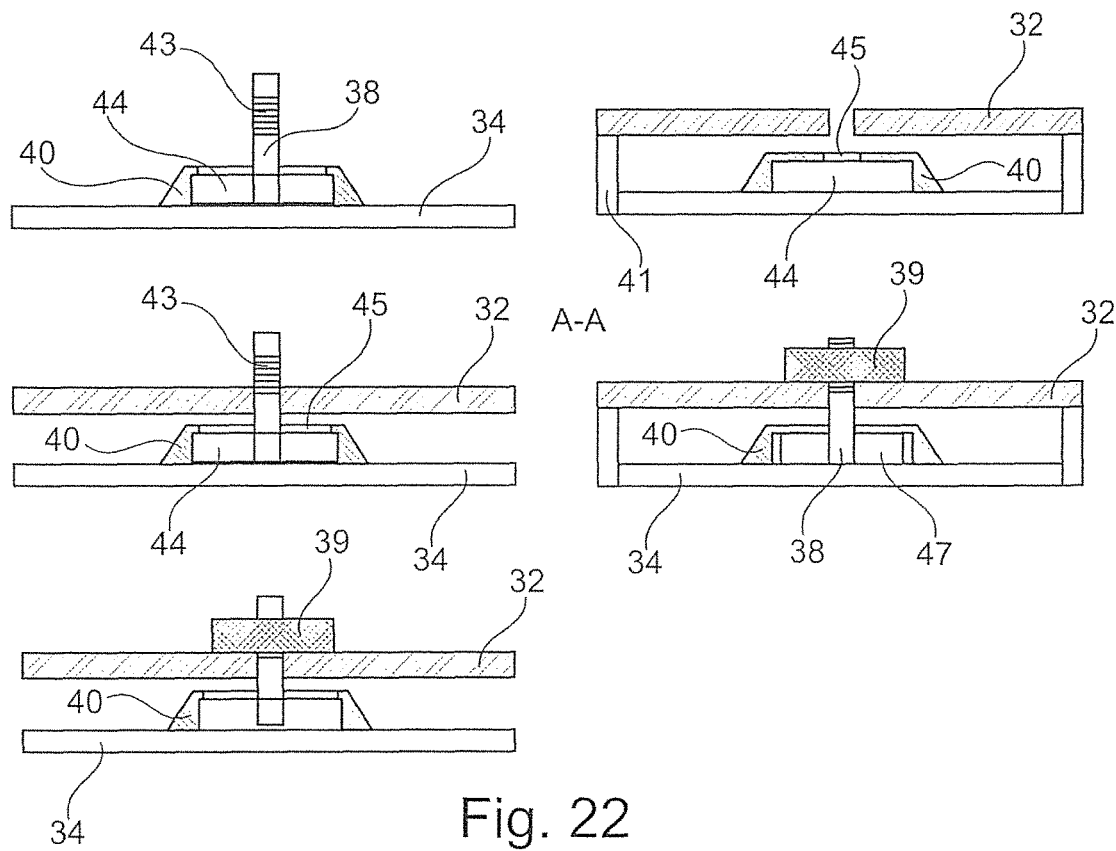
Figure 23:
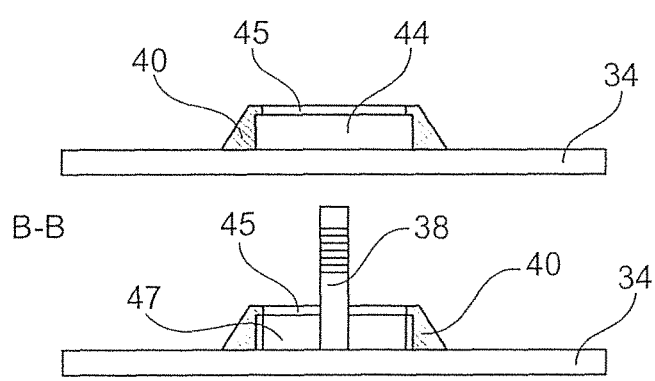
Figure 24:
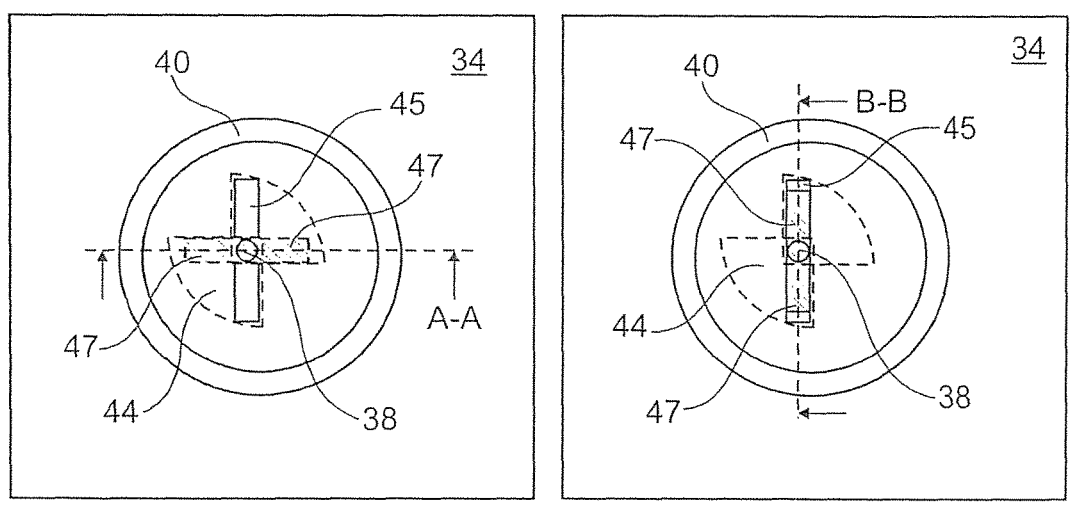

In FIG. 21 and the following a further design variant by analogy with FIGS. 14 to 20 is described, where identical parts again have the same reference numerals and where reference can be made to the above description, if the illustrations are identical or similar. The exemplary embodiment shows, as can be seen from FIG. 21 in comparison with FIG. 5, a variant in which two opposite mounting sections 47 are provided on the bolt 38. The result is therefore a T-shaped design, with which it is possible, by analogy with the exemplary embodiment in FIGS. 14 to 20, to insert the mounting section 47 of the bolt 38 through a slot 45 provided double and then rotate the bolt 38 about the bolt axis 46. This is shown in particular in FIG. 24, by analogy with FIG. 14, with the right-hand representation of FIG. 24 showing the insertion of the bolt 38 while the left-hand representation shows a position rotated by 90°. Correspondingly, FIGS. 22 and 23 each show recesses 40 provided double, by analogy with FIGS. 15 and 16.

LIST OF REFERENCE NUMERALS

1 Engine axis
10 Gas-turbine engine
11 Air inlet
12 Fan rotating inside the casing
13 Intermediate-pressure compressor
14 High-pressure compressor
15 Combustion chamber
16 High-pressure turbine
17 Intermediate-pressure turbine
18 Low-pressure turbine
19 Exhaust nozzle
20 Guide vanes
21 Engine casing
22 Compressor rotor blades
23 Stator vanes
24 Turbine blades
26 Compressor drum or disk
27 Turbine rotor hub
28 Exhaust cone
29 Fuel nozzle
30 Combustion chamber outer casing
31 Combustion chamber inner casing
32 Combustion chamber wall
33 Turbine inlet guide vane row
34 Combustion chamber tile
35 Admixing hole
36 Inflow direction
37 Effusion cooling hole
38 Bolt
39 Nut
40 Mounting element
41 Support
42 Locking pin
43 Thread
44 Recess
45 Slot
46 Bolt axis
47 Mounting section

What is claimed is:

1. A combustion chamber tile of a gas turbine comprising:
a plate body having a combustion side facing in a combustion chamber interior direction and a combustion chamber wall side facing in a combustion chamber wall direction;
a mounting element positioned on the combustion chamber wall side of the plate body and having an exposed outer side facing in the combustion chamber wall direction, wherein the mounting element has a first relative height at the exposed outer side of the mounting element measured with respect to a reference point on the combustion chamber wall side of the plate body;
a separate bolt anchored to the mounting element, the separate bolt for mounting the combustion chamber tile on a combustion chamber wall;
wherein the separate bolt includes a mounting section at an end area of the separate bolt, the mounting section arranged at a right angle to a bolt axis of the separate bolt such that the separate bolt is L-shaped or T-shaped, the mounting section positioned in a recess of the mounting element;
a support for supporting the plate body and spacing the plate body from against the combustion chamber wall, the support extending from the plate body in the combustion chamber wall direction and having an exposed outer side facing in the combustion chamber wall direction for engaging the combustion chamber wall, wherein the support has a second relative height at the exposed outer side of the support, measured with respect to the reference point;
wherein the first relative height of the mounting element is smaller than the second relative height of the support.

2. The combustion chamber tile in accordance with claim 1, wherein the separate bolt with the mounting section is insertable into the mounting element in a direction of the bolt axis and rotatable about the bolt axis by a given angular range.

3. The combustion chamber tile in accordance with claim 2, wherein the combustion chamber tile includes a plurality of mounting elements, with recesses of the mounting elements being open towards different directions.

4. The combustion chamber tile in accordance with claim 2, wherein the mounting element includes effusion cooling holes.

5. The combustion chamber tile in accordance with claim 2, wherein the mounting section is accommodated in the mounting element with a clearance.

6. The combustion chamber tile in accordance with claim 1, wherein the separate bolt with the mounting section is insertable into the recess in a direction perpendicular to the bolt axis.

7. The combustion chamber tile in accordance with claim 6, wherein the combustion chamber tile includes a plurality of mounting elements, with recesses of the mounting elements being open towards different directions.

8. The combustion chamber tile in accordance with claim 6, wherein the mounting element includes effusion cooling holes.

9. The combustion chamber tile in accordance with claim 6, wherein the mounting section is accommodated in the mounting element with a clearance.

10. The combustion chamber tile in accordance with claim 6, wherein the mounting section is plate shaped or bar shaped.

11. The combustion chamber tile in accordance with claim 6, wherein the separate bolt is a threaded bolt.

12. The combustion chamber tile in accordance with claim 6, wherein the separate bolt and the combustion chamber tile are made from different materials.

13. The combustion chamber tile in accordance with claim 6, wherein the mounting section is accommodated in the mounting element without a clearance.

14. The combustion chamber tile in accordance with claim 1, wherein the combustion chamber tile includes a plurality of mounting elements, with recesses of the mounting elements being open towards different directions.

15. The combustion chamber tile in accordance with claim 1, wherein the mounting element includes effusion cooling holes.

16. The combustion chamber tile in accordance with claim 1, wherein the mounting section is accommodated in the mounting element with a clearance.

17. The combustion chamber tile in accordance with claim 1, wherein the mounting section is plate shaped or bar shaped.

18. The combustion chamber tile in accordance with claim 1, wherein the separate bolt is a threaded bolt.

19. The combustion chamber tile in accordance with claim 1, wherein the separate bolt and the combustion chamber tile are made from different materials.

20. The combustion chamber tile in accordance with claim 1, wherein the mounting section is accommodated in the mounting element without a clearance.

\* \* \* \* \*